United States Patent [19]
Lee

[11] Patent Number: 5,938,342
[45] Date of Patent: Aug. 17, 1999

[54] SEMI-SPHERICAL BEARING

[75] Inventor: Chang-Woo Lee, Suwon, Rep. of Korea

[73] Assignee: Samsung Electronics Co., Ltd., Suwon, Rep. of Korea

[21] Appl. No.: 08/934,067

[22] Filed: Sep. 19, 1997

[30] Foreign Application Priority Data

Nov. 13, 1996 [KR] Rep. of Korea .................... 96-39853

[51] Int. Cl.⁶ .................................................. F16C 32/06
[52] U.S. Cl. ............................................................... 384/108
[58] Field of Search ................................. 384/108, 109

[56] References Cited

U.S. PATENT DOCUMENTS 3,265,452  8/1966  Pan et al. .................. 384/109
3,799,629  3/1974  Laing ......................... 384/108
3,883,193  5/1975  Hepp et al. ................. 384/108
3,904,256  9/1975  Pfeifer ....................... 384/108
4,135,771  1/1979  Huber et al. ............... 384/108

FOREIGN PATENT DOCUMENTS 2131432  1/1972  Germany .................. 384/108

*Primary Examiner*—Thomas R. Hannon
*Attorney, Agent, or Firm*—Burns, Doane, Swecker & Mathis, L.L.P.

[57] ABSTRACT

A semi-spherical bearing disposed in a rotor of a motor has a bottom disposed on a horizontal plane and a top and comprising a plurality of grooves, each of the grooves extending from the bottom toward the top and being defined by one end wall and two side walls, all of which are formed on an outer circumference of the bearing, and the end wall being processed at an angle of 85° or more with respect to the horizontal plane.

3 Claims, 9 Drawing Sheets

340   341

SEMI-SPHERICAL BEARING

FIELD OF THE INVENTION

The present invention relates to a semi-spherical bearing, and more particularly, to a semi-spherical bearing which improves the forming of grooves of the semi-spherical bearing to make the manufacture of the same easy.

BACKGROUND OF THE INVENTION

Among the different bearings that support shafts undergoing rotative or rectilinear movement and make such movement smooth, the semi-spherical bearing is advantageous in that it is able to simultaneously support load in both the radial and axial directions. Accordingly, it is unnecessary to use separate bearings for each of the directions such that weight can be reduced, allowing application to internal motors in electronic goods such as computer hard drives, laser beam scanners, laser beam printers, etc.

With regard to the laser beam printer, laser beams are used to perform the printing operation. That is, a scanned image is formed on a photosensitive drum, which is responsive to light, by radiating the laser beams thereon. A rotating multi-faceted mirror system is provided to move the beams at a uniform velocity such that the beams are aligned on the photosensitive drum in an axial direction thereon.

Referring to FIG. 1, there is shown a sectional view illustrating a rotating multi-faceted mirror system in which a conventional semi-spherical bearing is mounted. As shown in the drawing, the rotating multi-faceted mirror system 10 comprises a multi-faceted mirror 11 which reflects beams onto a photosensitive drum (not shown), and a motor 20 for rotating and supporting the multi-faceted mirror 11. A housing 12 is provided encasing the multi-faceted mirror 11. The housing 12 includes a hole 12a through which the multi-faceted mirror 11 is exposed.

The motor 22 comprises a stator 21 and a rotor 22, electromagnetically cooperating with the stator 21. The stator 21 includes a stator frame 21a and a stator coil 21b wrapped around the stator frame 21a, while the rotor 22 includes a rotor bushing 22a and a rotor magnet 22b provided around a circumference of the rotor bushing 22a. A lens bracket 13, which fixedly supports the multi-faceted mirror 11, is mounted on an upper portion of the rotor bushing 22a such that the multi-faceted mirror 11 rotates together with the rotor bushing 22a.

A semi-spherical bearing 24 is inserted in upper and lower parts of the rotor bushing 22a such that the same is supported and able to rotate. The semi-spherical bearings 24 are fixed by a support shaft 23 provided through a center of the rotor frame 21a, the semi-spherical bearings 24 being disposed such that their spherical portions face one another.

A plurality of grooves 24a are formed on an outer circumference of the semi-spherical bearings 24 to allow for smooth rotation with the rotor bushing 22a. The grooves 24a, as shown in FIGS. 2 and 3, are spiral-shaped to allow for suction of air for smooth rotation.

However, the prior art semi-spherical bearing structured as in the above has a drawback in that the manufacturing process is complicated. Namely, a lathe is first used to form the semi-spherical shape, then the grooves are formed at a predetermined depth using an etching process. Because many steps are needed in the process to manufacture the semi-spherical bearing, overall manufacturing costs are increased.

Further, if a mold 30, shown by the shaded portion in FIG. 2, is used to form end portions of the grooves, it is possible for the end portions of the grooves to become stuck in the mold 30 making removal difficult.

SUMMARY OF THE INVENTION

The present invention has been made in an effort to solve the above problems. It is an object of the present invention to provide a semi-spherical bearing which forms end portions of grooves at an angle of 85° or over, relative to a horizontal plane, such that the semi-spherical bearing can be manufactured using a mold.

To achieve the above object, the present invention provides a semi-spherical bearing disposed in a rotor of a motor, the semi-spherical bearing having a bottom disposed on a horizontal plane and a top and comprising a plurality of grooves, each of the grooves extending from the bottom toward the top and being defined by one end wall and two side walls, all of which are formed on an outer circumference of the bearing, and the end wall being processed at an angle of 85° or more with respect to the horizontal plane.

According to a feature of the present invention, the grooves extend from the bottom toward the top in a spiral shape.

According to another feature of the present invention, the grooves extend from the bottom toward the top in a straight line.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will now be described in detail with reference to the accompanying drawings.

Figure 1:
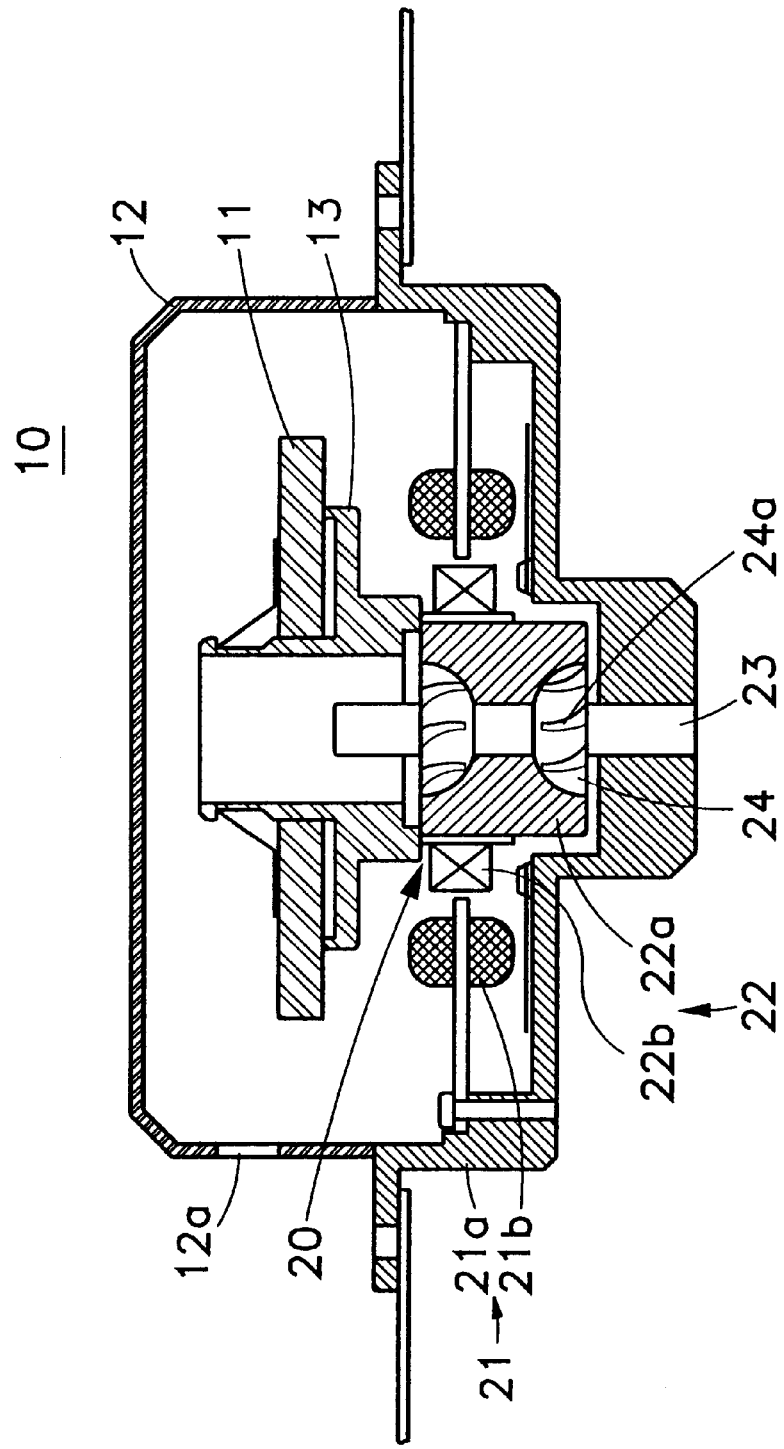
FIG. 1 is a vertical sectional view of the prior art rotating multi-faceted mirror system.
Figure 2:
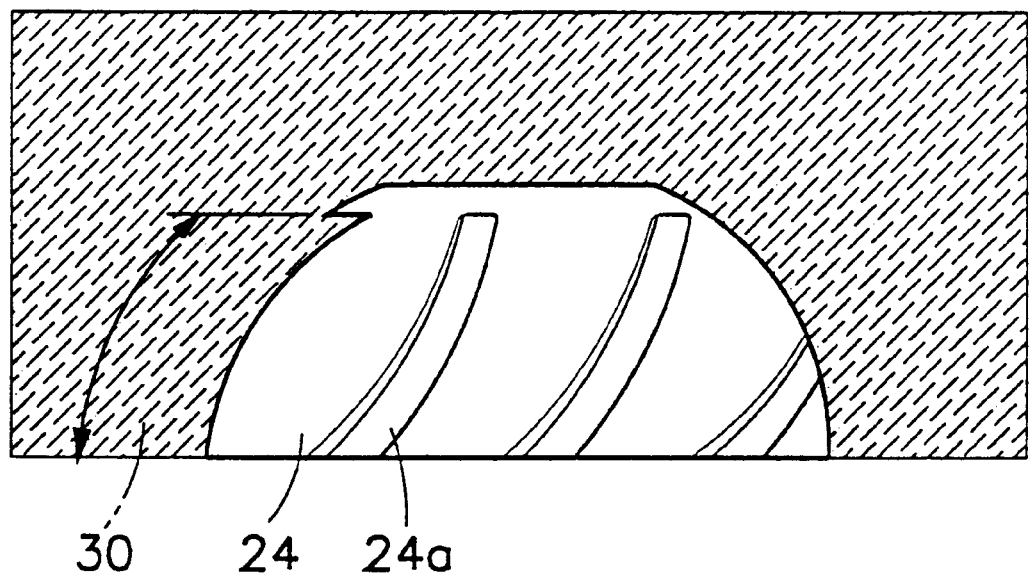
FIG. 2 is front sectional view of the prior art semi-spherical bearing.
Figure 3:
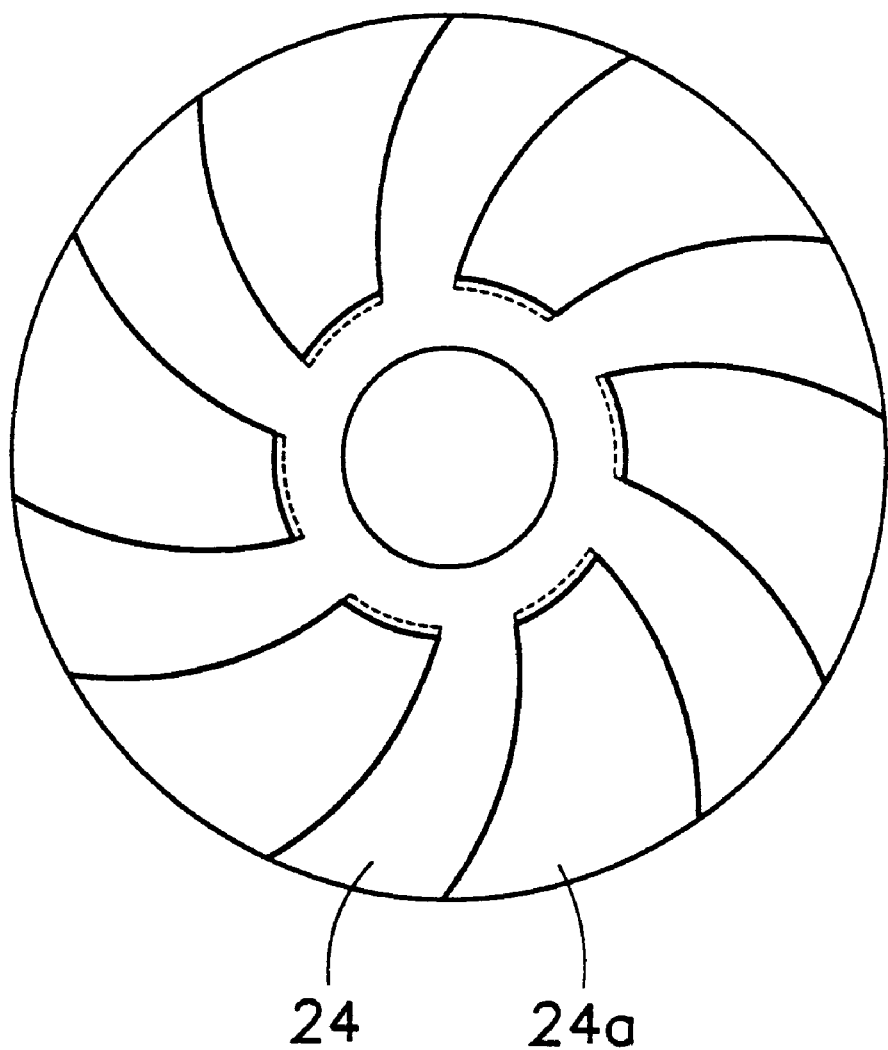
FIG. 3 is a plane view of the prior art semi-spherical bearing.
Figure 4:
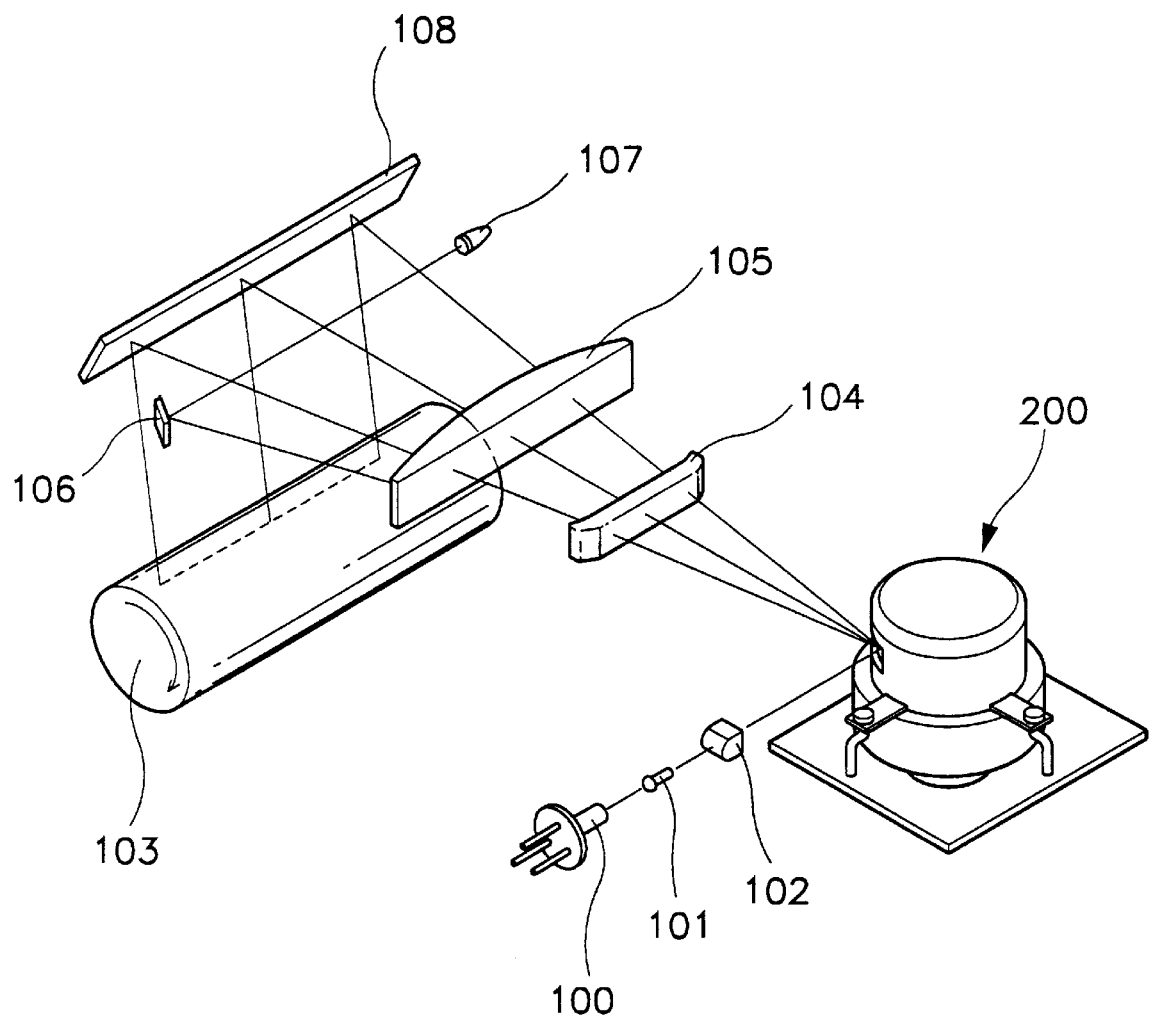
FIG. 4 a schematic view of an internal structure of a laser beam printer using a rotating multi-faceted mirror system in which inventive semi-spherical bearings are provided.

Referring to FIG. 4, there is shown a schematic view of an internal structure of a laser beam printer using a rotating multi-faceted mirror system in which inventive semi-spherical bearings are provided.

As shown in the drawing, the laser beam printer comprises a semiconductor laser 100 and a collimate lens 101 for converting light from the semiconductor laser 100 into laser beams. The laser beam printer further comprises a rotating multi-faceted mirror system 200 for converting the laser beams into a fan beam, and a cylindrical lens 102 disposed between the multi-faceted mirror system 200 and the collimate lens 101.

There is provided a photosensitive drum 103 for recording a print information pattern using beams radiated from the cylindrical lens 102 via the multi-faceted mirror system 200. Disposed between the multi-faceted mirror system 200 and the photosensitive drum 103, in order, are a spherical lens 104, a toric lens 105, a horizontal synchronizing lens 106, a detecting sensor 107, and a reflector 108.

Beams are radiated toward the photosensitive drum 103 at a uniform velocity by the multi-faceted mirror system 200, pass through the spherical lens 104 to be focused on the photosensitive drum 103, and are reflected onto desired positions on the photosensitive drum 103 by the reflector 108. Further, the horizontal synchronizing lens 106 and the detecting sensor 107 are used to ensure that the beams are radiated at equal horizontal positions on the photosensitive drum 103.

As stated above, light radiated from the semiconductor laser 100 passes through the collimate lens 101 to be converted into laser beams. These laser beams pass through the cylindrical lens 102 to be positioned parallel to one another. Perpendicular laser beams are condensed in the multi-faceted mirror system 200, while the horizontal laser beams are converted into a fan beam.

The laser beams are radiated from the multi-faceted mirror system 200 at a uniform velocity, such that they are at equal positions relative to an axial direction of the photosensitive drum 103, then pass through the toric lens 105 to be focused by the same. The laser beams are then reflected to a desired position on the photosensitive drum 103 by the reflector 108. Here, beams that are off course are reflected by the horizontal synchronizing lens 106 to be input into the detecting sensor 107 such that the laser beams are positioned correctly on the photosensitive drum 103.

Figure 5:
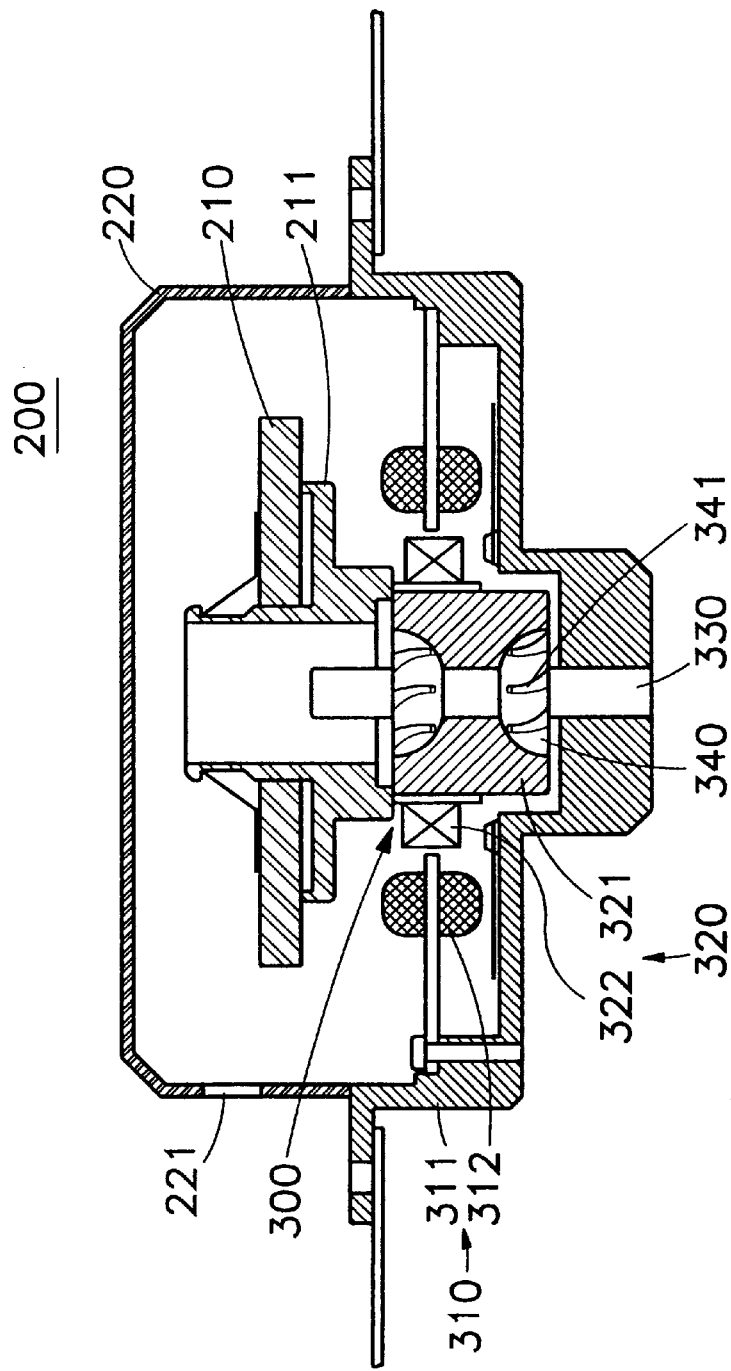
FIG. 5 is a vertical sectional view of a rotating multi-faceted mirror system applying semi-spherical bearings according to a first preferred embodiment of the present invention.

Referring to FIG. 5, there is shown a vertical sectional view of a rotating multi-faceted mirror system applying semi-spherical bearings according to a first preferred embodiment of the present invention. As shown in the drawing, the rotating multi-faceted mirror system 200 includes a multi-faceted mirror 210 which reflects beams onto the photosensitive drum 103 (see FIG. 4), and a motor 300 for rotating and supporting the multi-faceted mirror 210.

The motor 300 comprises a stator 310 and a rotor 320. The stator 310 includes a stator frame 311 and a stator coil 312 wrapped around the stator frame 311, while the rotor 320 includes a rotor bushing 321 and a rotor magnet 322 provided around a circumference of the rotor bushing 321. A lens bracket 211, which fixedly supports the multi-faceted mirror 210, is mounted on an upper portion of the rotor bushing 321 such that the multi-faceted mirror 210 rotates together with the rotor bushing 321. A housing 220 is provided on an upper portion of the rotor bushing 321 encasing the multi-faceted mirror 210, the housing 220 rotating together with the rotor bushing 321. The housing 220 includes a hole 221 through which beams pass, part of which are exposed and reflected by the multi-faceted mirror 11.

A semi-spherical bearing 340 is inserted in upper and lower parts of the rotor bushing 322 such that the same is supported and able to rotate. The semi-spherical bearings 340 enable the multi-faceted mirror 210 to rotate smoothly and without vibration by the rotor 320. The semi-spherical bearings 340 are fixed by a support shaft 330 provided through a center of the rotor frame 311, the semi-spherical bearings 340 being disposed such that their spherical portions face one another.

A plurality of grooves 341 are formed on an outer circumference of the semi-spherical bearings 340 to allow for smooth rotation with the rotor bushing 321. The grooves 341 are spiral-shaped to allow for suction of air for smooth rotation.

Figure 6:
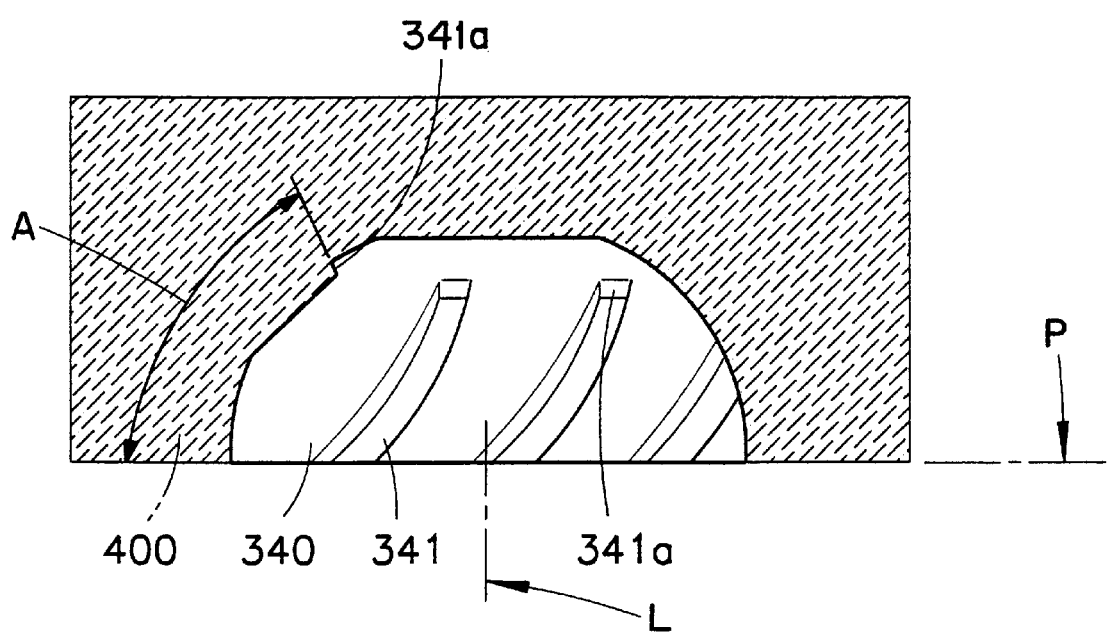
FIG. 6 is a front sectional view of the semi-spherical bearing shown in FIG. 5.
Figure 7:
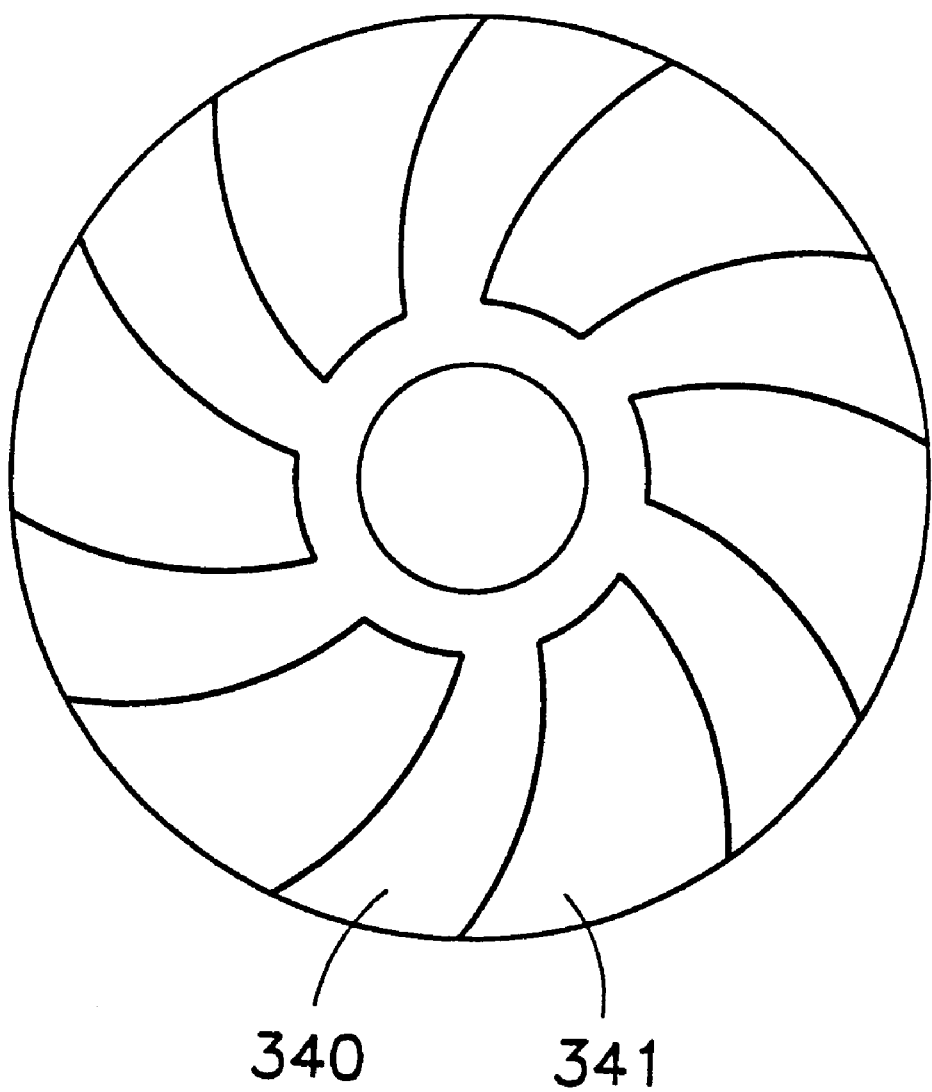
FIG. 7 is a plane view of the semi-spherical bearing shown in FIG. 5.

The grooves 341 will be explained in more detail with reference to FIGS. 6 and 7. As shown in the drawings, a plurality of spiral-shaped grooves 341 are formed on an outer circumference of the bearing 340. The semi-spherical bearing 340 has a top T and a bottom disposed on a horizontal plane P oriented perpendicular to a longitundinal axis of rotation L of the bearing. Each groove 341 is open at the bottom and is closed by an end wall 341a located adjacent the top. The end wall 341a of each groove 341 is processed to be inclined at a predetermined angle A with respect to the horizontal plane. That is, the angle between the end wall 341a and the horizontal plane is about 85° or more. Accordingly, the bearing 340, in a state with the grooves 341 formed thereon, can be easily extracted from a mold 400 (FIG. 6). The setting of the angle of the end wall 341a to such a degree is done to prevent the semi-spherical bearing 340 from being elastically deformed during removal from the mold 400.

With the forming of the end walls 341a of the grooves 341 at an angle of 85° or over, it is possible to easily remove the bearing 340 from the mold 400. Namely, because of the angle formed in the end walls 341a, the bearing 340 can be removed by rotating the same by a predetermined amount to easily release the bearing 340 from the mold.

Figure 8:
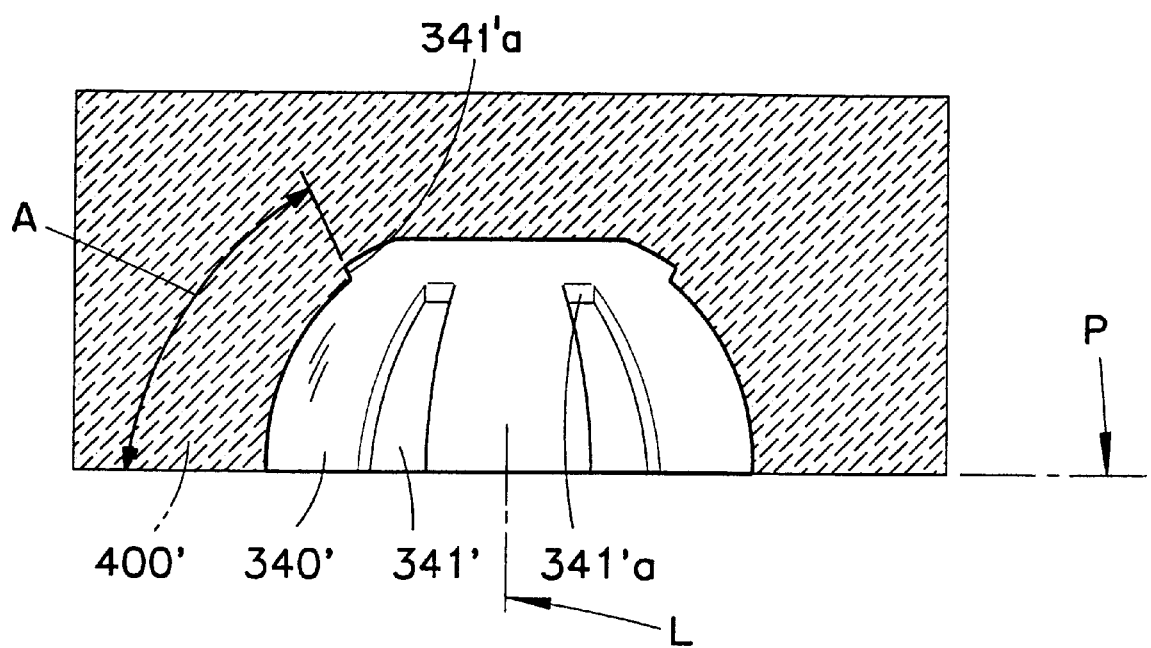
FIG. 8 is front sectional view of a semi-spherical bearing according to a second preferred embodiment of the present invention.
Figure 9:
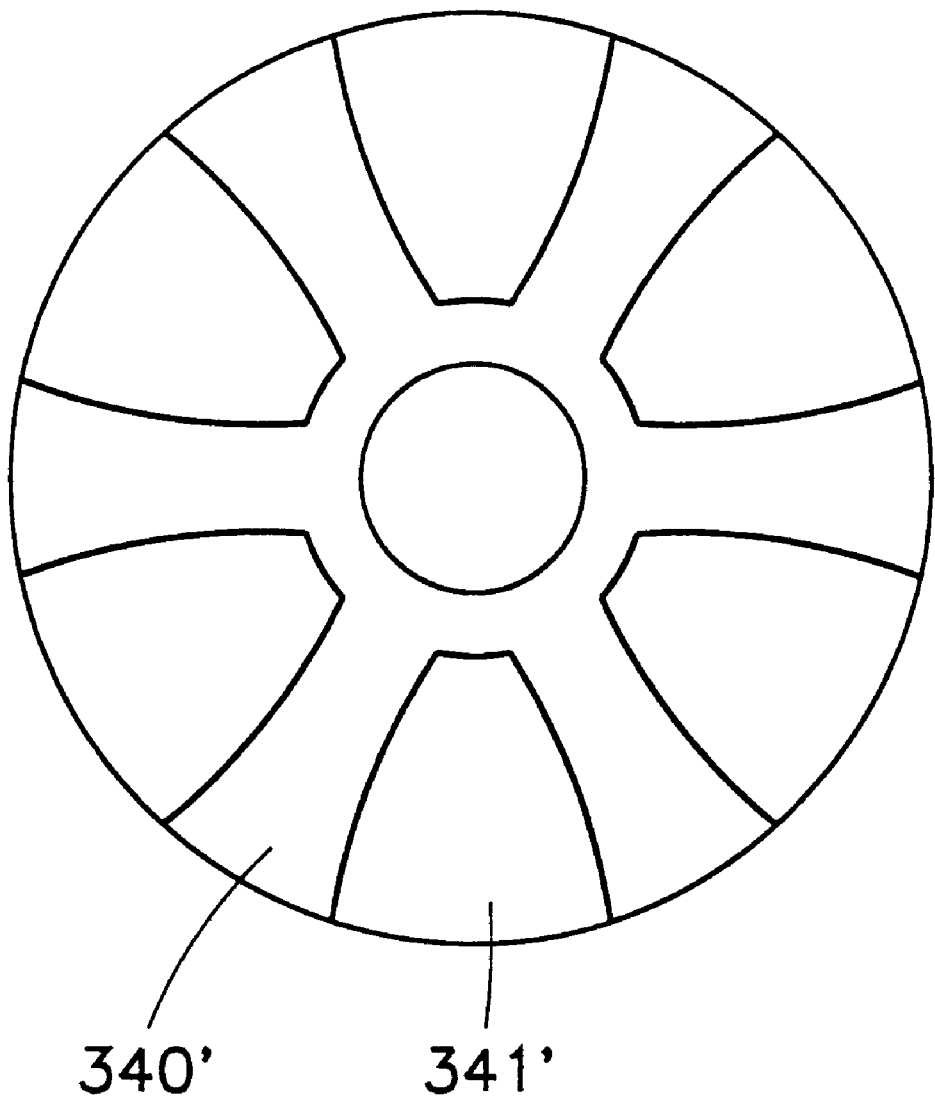
FIG. 9 is front sectional view of the semi-spherical bearing shown in FIG. 8.

Referring now to FIGS. 8 and 9, there is shown a semi-spherical bearing 340' according to a second preferred embodiment of the present invention. As shown in the drawings, end walls 341'a of grooves 341' of the bearing 340' are formed at an angle of 85° or over, relative to a horizontal plane. The grooves 341'are formed in a straight line extending downward from the end walls 341'a. This allows the bearing 340' to be more easily removed from a mold 400' (see FIG. 8).

In the semi-circular bearing structured as in the above, as it is possible to use a mold to form the bearing by enabling easy removal from the mold, the manufacture of the semi-circular bearing is easy and efficient, ultimately reducing manufacturing costs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A semi-spherical bearing disposed in a rotor of a motor, the semi-spherical bearing defining a longitudinal axis of rotation and having a bottom disposed on a plane oriented perpendicularly to the axis, the bearing further including a top spaced from the plane, and a plurality of grooves, each of the grooves extending from the bottom toward the top and being defined by one end wall and two side walls, all of which are formed in an outer circumference of the bearing, each of the grooves being open at the bottom of the bearing and closed by the respective end wall at a location adjacent to the top of the bearing, and the end wall extending at an angle of 85° or more with respect to the plane.

2. The semi-spherical bearing according to claim 1, wherein the grooves extend from the bottom toward the top in a spiral shape.

3. The semi-spherical bearing according to claim 1, wherein the grooves extend from the bottom toward the top in a straight line.

\* \* \* \* \*